(12) United States Patent
Holmes et al.

(10) Patent No.: US 9,155,997 B2
(45) Date of Patent: *Oct. 13, 2015

(54) MERCURY CONTROL USING MODERATE-TEMPERATURE DISSOCIATION OF HALOGEN COMPOUNDS

(71) Applicant: ENERGY & ENVIRONMENTAL RESEARCH CENTER FOUNDATION, Grand Forks, ND (US)

(72) Inventors: Michael J. Holmes, Thompson, ND (US); John H. Pavlish, East Grand Forks, MN (US); Edwin S. Olson, Grand Forks, ND (US)

(73) Assignee: ENERGY & ENVIRONMENTAL RESEARCH CENTER FOUNDATION, Grand Forks, ND (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/446,992

(22) Filed: Jul. 30, 2014

(65) Prior Publication Data

US 2014/0341793 A1 Nov. 20, 2014

Related U.S. Application Data

(63) Continuation of application No. 13/544,971, filed on Jul. 9, 2012, now Pat. No. 8,807,056, which is a continuation of application No. 12/167,054, filed on Jul. 2, 2008, now Pat. No. 8,312,822.

(60) Provisional application No. 60/947,543, filed on Jul. 2, 2007.

(51) Int. Cl.
*B01D 53/64* (2006.01)
*F23J 15/02* (2006.01)
*F23J 15/04* (2006.01)

(52) U.S. Cl.
CPC .......... *B01D 53/64* (2013.01); *B01D 2251/404* (2013.01); *B01D 2257/602* (2013.01)

(58) Field of Classification Search
CPC ............. B01D 53/64; B01D 2251/404; B01D 2257/602
USPC ................. 422/139, 147, 168, 171–173, 177; 423/210; 95/134; 110/203, 315, 345
See application file for complete search history.

(56) References Cited

U.S. PATENT DOCUMENTS

| 5,405,420 A | 4/1995 | Yang |
| 6,447,740 B1 | 9/2002 | Caldwell et al. |

(Continued)

FOREIGN PATENT DOCUMENTS

| WO | 2007149867 | 12/2007 |
| WO | WO 2007149867 A1 * | 12/2007 |

OTHER PUBLICATIONS

Benson et al. "Pilot-and-fullscale demonstration of advanced mercury control technologies for lignite-fired power plants" Feb. 2004, Energy and Environmental research Center, 1-33.*

(Continued)

*Primary Examiner* — Stanley Silverman
*Assistant Examiner* — Syed Iqbal

(57) ABSTRACT

A system and method is provided for the removal of mercury from flue gas. Effective removal of mercury is obtained by oxidation of elemental mercury, with highly reactive halogen species derived from dissociation of halogen compounds at moderate temperatures brought into contact with the flue gas with or without the addition of carbon.

19 Claims, 3 Drawing Sheets

(56) References Cited

U.S. PATENT DOCUMENTS

| | | | |
|---|---|---|---|
| 6,808,692 | B2 | 10/2004 | Oehr |
| 6,855,859 | B2 | 2/2005 | Nolan et al. |
| 6,878,358 | B2 | 4/2005 | Vosteen et al. |
| 7,615,101 | B2* | 11/2009 | Holmes et al. ............ 95/107 |
| 7,628,969 | B2* | 12/2009 | Holmes et al. ............ 423/242.1 |
| 8,007,749 | B2 | 8/2011 | Chang et al. |
| 2003/0065236 | A1 | 4/2003 | Vosteen et al. |
| 2003/0161771 | A1* | 8/2003 | Oehr ............ 423/210 |
| 2003/0185718 | A1 | 10/2003 | Sellakumar |
| 2003/0235525 | A1 | 12/2003 | Honjo et al. |
| 2004/0003716 | A1 | 1/2004 | Nelson |
| 2004/0013589 | A1 | 1/2004 | Vosteen et al. |
| 2004/0069610 | A1 | 4/2004 | Arno et al. |
| 2004/0069613 | A1 | 4/2004 | Agnew et al. |
| 2004/0086439 | A1 | 5/2004 | Vosteen et al. |
| 2005/0036926 | A1 | 2/2005 | Lissanski et al. |
| 2005/0131186 | A1* | 6/2005 | Percec et al. ............ 526/344 |
| 2006/0029531 | A1 | 2/2006 | Breen et al. |
| 2006/0048646 | A1 | 3/2006 | Olson et al. |
| 2007/0167309 | A1 | 7/2007 | Olson |
| 2007/0180990 | A1 | 8/2007 | Downs et al. |
| 2008/0107579 | A1 | 5/2008 | Downs et al. |
| 2009/0297413 | A1* | 12/2009 | Olson et al. ............ 423/215.5 |

OTHER PUBLICATIONS

Ermakov et al. "Application of flash photolysis for high threshold chemical reaction stimulation", 1986, Journal of Radioanalytical and Nuclear Chemistry, vol. 101, 395-399.*

Benson et al., "Pilot-and full-scale demonstration of advanced mercury control technologies for lignite-fired power plants", Energy & Environmental Research Center, 1-33, Feb. 2004.

Dunham et al., "Mercury Capture by an activate carbon in a fixed-bed bench-Scale System", Environmental Progress, pp. 203-208, 1998.

Ermakov et al., "Application of flash photolysis for high threshhold chemical reaction stimulation", Journal of Radioanalytical and Nuclear Chemistry, vol. 101, pp. 395-399, 1986.

Pavlish et al., "Status review of mercury control options for coal-fired power plants", Fuel Processing Technology, vol. 82, pp. 89-165, 2003.

Wang et al., "Reactions and energy distribution in dissociative electron capture processes in sulfuryl halides", International Journal of Mass Spectrometry and Ion Physics, vol. 36, pp. 233-247, 1980.

Ariya, P.A.; Khalizov, A.; Gidas, A. J., Reactions of Gaseous Mercury with Atomic and Molecular Halogens: Kinetics, Product Studies, and Atmospheric Implications, Phys.Chem. A 2002, 106, 7310.

Horne, D.G.; Gosavi, R.; O.P. Strausz, Reactions of Metal Atoms, J. Chem. Phys. 1968, 48, 4758.

Mamani-Paco, R.M.; Helble, J.J. Bench-Scale Examination of Mercury Oxidation under Non-Isothermal ConditionsProceedings of the A&WMA Annual Conference; Salt Lake City, AWMA: Pittsburgh, 2000.

MacColl, A. J., Studies in the Pyrolysis of Organic Bromides, Chem. Soc., 1955, 965.

Niksa, S.; Fujiwara, N., Predicting Mercury Speciation in Coal-Derived Flue Gases, Prepr. Pap.—Am. Chem. Soc., Div. Fuel Chem. 2003, 48 (2), 768.

Proceedings of Air Quality IV, Mercury, Trace Elements, and Particulate Matter Conference; Sep. 22-24, 2003.

Sliger, R.N.; Kramlich, J.C.; Marinov, N.M. Towards the development of a chemical kinetic model for the homogeneous oxidation of mercury by chlorine species, Fuel Process Technol. 2000, 65-66, 423.

Swinbourne, E.S., The Decomposition of Halogen Compounds, In Comprehensive Chemical Kinetics; Bamford, C. H.; Tipper, 1971.

Zhuang, Y.; Thompson, J.S.; Zygarlicke, C.J.; Galbreath, K.C.; Pavlish, J.P., Combustion Mercury Transformation and Kinetic Relationsips, Proceedings of Air Quality IV, Mercury, Trace Elements, and Particulate Matter Conference; Sep. 22-24, 2003.

Zhuang, Ye; Pavlish, J.H.; Holmes, M.J.; Benson, S.A. Pilot-Scale Study of Advanced Mercury Control Technologies for Lignite-Fired Power Plants in a Retrofit Advanced Hybrid Filter. Proceedings of the International Technical Conference on Coal Utilization & Fuel Systems, 2004; vol. 2, pp. 753-764.

* cited by examiner

MERCURY CONTROL USING MODERATE-TEMPERATURE DISSOCIATION OF HALOGEN COMPOUNDS

CROSS REFERENCE TO RELATED APPLICATIONS

This application is a continuation of commonly owned U.S. patent application Ser. No. 13/544,971 filed Jul. 9, 2012, which is a continuation of commonly owned U.S. patent application Ser. No. 12/167,054, filed on Jul. 2, 2008, now U.S. Pat. No. 8,312,822, issued on Nov. 20, 2012, entitled "MERCURY CONTROL USING MODERATE-TEMPERATURE DISSOCIATION OF HALOGEN COMPOUNDS,", which claims priority under 35 U.S.C. §119, commonly owned U.S. provisional patent application No. 60/947,543, filed on Jul. 2, 2007, entitled "MERCURY CONTROL USING MODERATE-TEMPERATURE DISSOCIATION OF HALOGEN COMPOUNDS," which are incorporated by reference herein.

This invention was made with U.S. government support under Contract No. CR-83092901-0 awarded by the Environmental Protection Agency. The government has certain rights in this invention.

FIELD OF THE INVENTION

The present invention relates to mercury emission control systems. In particular, the invention is drawn to a system and method for removing mercury from a flue gas stream using dissociation of halogen compounds.

BACKGROUND OF THE INVENTION

Because mercury (Hg) is toxic and can bioaccumulate in the human body, mercury emissions have become a health concern. The U.S. Environmental Protection Agency (EPA) has recently determined that regulation of Hg emissions from coal-fired electric power plants is necessary and appropriate. The various state and federal mercury regulations have created an urgent need to develop effective control technologies. Mercury in flue gas can be captured by injection of powdered sorbents which are removed by subsequent particulate collection devices. Although sorbent injection is, so far, the most mature control technology, the amount of sorbent needed to serve the U.S. market is expected to be so large that there is still a need to develop new methods to minimize changes required for utilities and to reduce costs associated with capital equipment and carbon injection.

SUMMARY OF THE INVENTION

A method of the invention is provided for removing mercury from a flue gas stream of a coal combustion system, including generating a dissociated halogen gas from a reactive precursor at a temperature in the range of 60°-400° C., introducing the dissociated (atomic) halogen gas to the flue gas stream to allow the dissociated halogen gas to react with mercury present in the flue gas stream at a temperature in the range of 60°-400° C., and capturing the mercury using a pollutant control device.

Another embodiment of the invention provides a mercury control system for a coal combustion system having a coal combustor and a pollutant control device, the mercury control system including a halogen dissociation unit for generating a dissociated halogen gas, the halogen dissociation unit being in communication with a flue gas stream of the coal combustion system, and wherein the mercury control system is configured to expose the dissociated halogen gas to mercury present in the flue gas stream, allowing the dissociated halogen gas to react with the mercury at a temperature in the range of 60°-400° C. and be captured by the pollutant control device.

Other features and advantages of the present invention will be apparent from the accompanying drawings and from the detailed description that follows below.

BRIEF DESCRIPTION OF THE DRAWINGS

The present invention is illustrated by way of example and not limitation in the figures of the accompanying drawings, in which like references indicate similar elements and in which.

DETAILED DESCRIPTION

Figure 1:
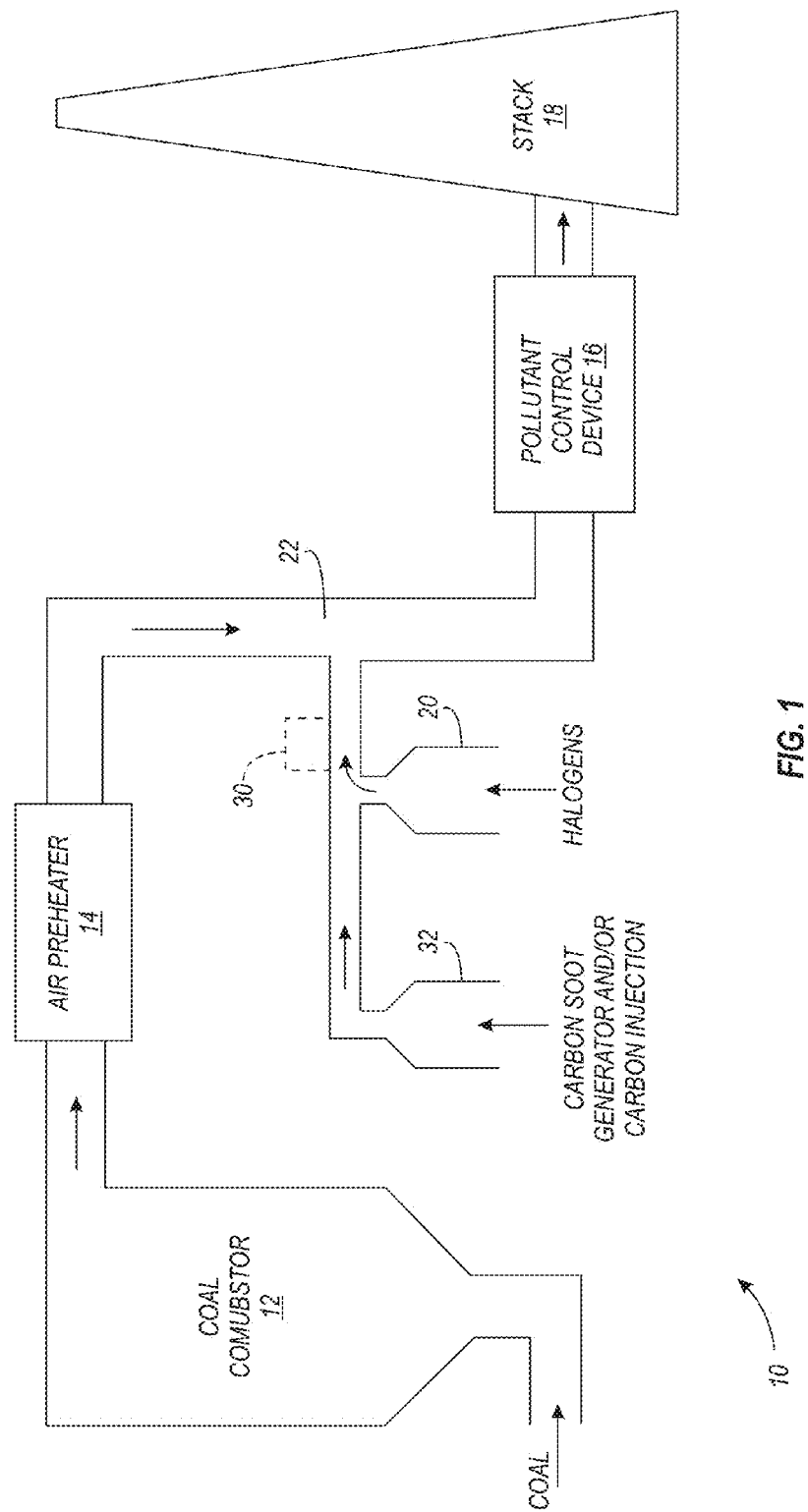
FIG. 1 is a schematic diagram of a halogen dissociation system applied in a coal-fired system.

To understand the present invention, it is helpful to understand various chemical reactions that take place in a coal-fired combustion system. Flue gas constituents, especially halogens or halides, have great impacts on mercury fate in flue gas. The chlorine in coals or halogen compounds that have been added to the fuel are converted in the furnace to the atomic form, but being highly reactive, react with flue gas components and each other to form the molecular forms. Reactions with water vapor, $SO_2$, and other components occur and form products such as $HCl$, $SO_2Cl_2$, and $Cl_2$. As the flue gas cools, reactions of atomic or molecular halogens with elemental mercury may occur. Heterogeneous reactions with or on particulate may also occur in addition to gas-phase reactions.

Reactions of atomic chlorine generated in a furnace are kinetically limited and heavily depend on temperature-time profile. The issue is how much and what form is effective for oxidation of $Hg^0$ in the gas phase. Rate constants for Hg+Cl atoms can be determined by measuring the formation of HgCl using a spectroscopic (279-nm) method. The second-order rate constant for this Hg(I) species is about $1-3 \times 10^{-11}$ $cm^3$ $molecules^{-1}$ $sec^{-1}$. This reaction could be followed by a second reaction to form $HgCl_2$. Using indirect methods, second-order rate constants for $Hg^0$ with halogen species can be determined as follows: with Cl atoms, $1.0 \times 10^{-11}$ $cm^3$ $molecules^{-1}$ $sec^{-1}$; with Br atom, $3.2 \times 10^{-12}$ $cm^3$ $molecules^{-1}$ $sec^{-1}$; with $Br_2$, $9 \times 10^{-17}$ $cm^3$ $molecules^{-1}$ $sec^{-1}$; with $Cl_2$, $2.6 \times 10^{-18}$ $cm^3$ $molecules^{-1}$ $sec^{-1}$. Thus the atomic Cl rate constant is about 4 million times higher than $Cl_2$. However, under a typical temperature profile of a coal-fired utility plant, the atomic Cl generated in the combustion zone has already reacted with other flue gas constituents or itself before it could oxidize elemental mercury at the required lower temperatures. It is well known that the thermodynamics are favorable for formation of oxidized mercury compounds at temperatures less than about 400° C., owing to the instability of oxidized the mercury compounds.

Because halogen reactivity with mercury can be an important factor in mercury control, basic research in this area has been conducted. For example, the oxidation of Hg with injected HCl and $Cl_2$ has been studied using a quenching system comprising a gradient temperature reaction tube from which samples could be withdrawn for analysis. No oxidation occurred using realistic quench rates with 100 ppm HCl. This is expected: HCl is not an oxidizing agent, since it is already in a highly reduced form. Using a composition containing 50 ppm $Cl_2$ gave only 10% oxidation of $Hg^0$, while very large amounts (500 ppm) of $Cl_2$ gave 92% oxidation. The implication is that the more reactive atomic chlorine was not available in the system. In another example, HCl and Hg(II) acetate was injected into a natural gas flame and obtained oxidation data consistent with the formation of atomic chlorine and subsequent reaction of a superequilibrium concentration of atomic chlorine with $Hg^0$ at temperatures between 400° and 700° C. Using a very fast (10×) quench rate, up to 40% oxidation at 300 ppm Cl can be achieved.

Research recently demonstrated enormous mercury enrichment in ash when HCl was fed into a high-temperature environment followed by a super-fast quenching rate of 5400° C./s. Only 6% of the elemental mercury was not oxidized and converted to particulate forms. This experiment implies that atomic chlorine generated in the hot zone was still available at lower temperatures, owing to the fast quench rate and, thus, oxidized the mercury at a lower temperature where Hg—Cl reactions are most effective. While most of the mercury was on the ash, it was not clear whether oxidation occurred in the gas phase or solid phase, or where on the solid phase. The consensus is that much of the mercury is oxidized by reactive halogens in a heterogeneous reaction on a carbon particulate surface. The initial product of the atomic chlorine reaction with Hg is HgCl, which would readily collect on ash, carbon, or sorbent particles or react with other species or itself.

Further pilot-scale experimental data showed that the atomic halogen radicals formed at high temperatures can not only significantly enhance mercury oxidation, but also improve the reactivity of mercury with activated carbon. The atomic and/or molecular halogen species are formed, at least momentarily, in the high-temperature environment at high rates with mercury both as gas-phase and solid-gas interactions. Flue gas-quenching rate plays a critical role in the mercury-halogen chemistry. An excessive flue gas-quenching rate will preserve the reactive halogen species formed in the high-temperature zone for ongoing mercury oxidation and gas-to-particle conversion. However, rapid quenching is difficult to achieve in a practical application like utility flue gas treatment.

Recent bench-scale and pilot-scale experimental data demonstrate that halogenation of carbon resulted in vastly improved mercury capture kinetics and overall control performance. Halogen elements are able to activate the carbon surface to increase the reactivity of the carbon or the elements form more reactive forms under certain conditions. It is possible to generate the desired halogen radicals via high energy dissociation from relatively stable salts and compounds.

Generally, the invention is a system and method for enhancing sorbent (and ash) reactivity and/or for oxidation and removal of gaseous mercury in a flue gas with or without a sorbent. It obviates the fast quenching needed for effective homogeneous mercury oxidation by providing atomic (dissociated) halogen at a low enough temperature to effect the mercury oxidation to stable products that can be readily captured in a scrubber or ash particulate collector device. In addition, the generated reactive atomic halogens described herein can impregnate commercially available carbons and other sorbents in their feed line into coal-fired plants. The dissociated halogen-treated sorbents have an enhanced reactivity with mercury and improve mercury capture in flue gas.

In one example, the present invention utilizes a moderate temperature process to dissociate halogen-containing materials into atomic halogen forms which are very strong mercury oxidants. The highly reactive halogen used in the reactive portion of the mercury removal process can be used in any desired way. In one example, the dissociated halogen gas is passed directly into a flue gas stream to oxidize elemental mercury and/or transform gaseous mercury into a particulate-associated form. In another example, the dissociated halogen gas is generated by direct injection of the halogen compound gas into the flue gas at or above the decomposition temperature. In another example, the dissociated halogen gas is passed into a chamber or duct containing a carbon form that provides a reactive surface for the mercury oxidations.

In one example, a moderate-temperature halogen dissociation unit used with the present invention can be operated at temperatures ranging from approximately 60° to 400° C. to ensure an efficient dissociation. The actual temperature used is dependent upon the halogen materials used in any particular embodiment of the present invention. In one example, the reactive process of the moderate-temperature halogenated gas described herein can be applied anywhere in a coal-fired system from the boiler outlet to the inlet of a particle or flue gas desulfurization control device. Transport of the reactive dissociated halogen forms to the reaction process zone where it encounters the main flue gas stream occurs rapidly, in one example. The loss of temperature/energy of the dissociated gas should also occur rapidly either during or prior to entering the reaction zone. This maintains a superequilibrium of the atomic forms and minimizes unwanted side reactions. The generated reactive halogens described herein may impregnate carbons that are in situ-generated either in the halogen dissociation unit or in a separate carbon generation unit. The halogen-treated carbons have an enhanced reactivity with mercury and improve mercury capture in flue gas. In one example, the moderate-temperature halogen dissociation may be achieved by any heating and/or photolytic process to include convective, conductive, and radiative (light, microwave, Rf, arc, etc.) energy sources. In one example, the halogen-containing materials may be organic or inorganic chemical compounds, and they can be solid, liquid, and gas phases.

The present invention applies concepts relating to the formation and rapid transfer of radicals to a combustion flue gas into a practical and effective system and method for mercury control in a utility (or industrial) flue gas stream. Because of its high reactivity, it is difficult to preserve atomic chlorine generated in the furnace so that it will be available for reaction with $Hg^0$ at lower temperatures where the resulting mercury chloride will be stable. The present invention generates the atomic chlorine and other halogens and halogenated radical species at moderate temperatures either in the gas stream or in a separate chamber and introduces them to the flue gas stream at low temperatures either in the gas stream or in a separate chamber to a reactive carbon surface so that the long reaction time with other flue gas components is avoided.

Once converted to oxidized mercury by the reaction with the reactive halogen atoms, the Hg(II) halide species are captured readily via reaction on the solid ash phase or with an injected sorbent material, such as activated carbon, lime, calcium silicate, or other basic particulate. Alternatively, the gas stream containing oxidized mercury can be cleaned with a wet scrubber, where the mercury is converted to a stable solid or liquid form.

One concept employed in the present invention is that certain organic and inorganic halides have a relatively moderate to low decomposition temperature (<500° C.). The thermal and photochemical decompositions of organic halides result in breakage of the carbon-halogen bond and produce various halide products, depending on the nature of the halogen as well as the organic portion of the molecule. Some of the decompositions produce hydrogen halides (HX) via a unimolecular mechanism that simultaneously splits out the HX without formation of atomic halogen (X.) or molecular halogen ($X_2$). Decompositions of other compounds do involve the generation of atomic halogen and produce HX and other species in subsequent reactions of the radicals. It is especially the latter type of decompositions that could be used to furnish reactive halogen radicals for enhancement of sorbent reactivity or oxidation of mercury. Thus, heating these organic halides to temperatures above the decomposition temperature (typically, for example, 260°-500° C.) in a gas stream would generate in situ atomic halogen species that could be used to enhance sorbent reactivity or oxidation in a flue gas stream.

Organic bromides and chlorides, for example di- and polyhalides, will decompose to atomic halogen and other radicals at moderate temperatures (e.g., <500° C.). Iodides decompose readily with formation of I atom intermediates, since the C—I bond energy is so low. Fluorides typically decompose with rupture of the carbon-carbon bonds since the C—F bond energy is very high, and no atomic fluorine or HF is formed, although reactive fluorocarbenes are produced. Owing to the lower bond energy of carbon-bromine bonds, many alkyl bromides decompose via radical type decompositions. Examples of some reactive organobromine compounds are given in Table 1. Table 1 shows radical decomposition of various organobromine reactants, and an exemplary temperature range for dissociation.

TABLE 1

| Reactant | Lowest Temp. (° C.) of Range for Dissociation |
|---|---|
| Bromomethane | 500 |
| Bromoethane | 310-476 |
| 1-Bromopropane | 300-380 |
| Allyl Bromide | 320-380 |
| 1-Bromo-2-Methylpropane | 300-390 |
| 1-Bromo-2-Chloroethane | 307-358 |
| 1,2-Dibromoethane | 300 |
| t-Butyl Hypobromite | <300, Light |

Many alkyl chlorides will produce radicals when heated at moderate temperatures. Examples of the radical chlorine decompositions are listed in Table 2. Table 2 shows examples of various exemplary reactants the expected temperature of decomposition.

TABLE 2

| Reactant | Expected Temp. (° C.) of Decomposition |
|---|---|
| Chloroform | 450 |
| Carbon Tetrachloride | 554 |
| 1,2-Dichloroethane | 362 |
| 1,2-Dichloroethene | 370 |
| Trichloroethane | 380 |
| Tetrachloroethane | 262 |
| Allyl Chloride | 370 |
| Oxalyl Chloride | 260 |
| t-Butyl Peroxychloroformate | 60 |
| Methyl Chlorosulfite | 380 |
| Alkyl Hypochlorites | <300, Light |
| Phosgene | <450 |

Homolytic dissociation of the carbon-halogen bond to form atomic halogen and organic radicals requires substantial activation energy. Thus, most haloorganic compounds dissociate via a nonradical unimolecular mechanism to form the hydrohalogen acid (HX) where the HX splits off without any radical formation. The HX does nothing for oxidizing mercury. But the activation energy for splitting to radicals is lower when the organic radical that forms is stabilized, as in the allyl halide dissociation and in di- or polyhalo compounds dissociations where the double bond or the remaining halogen, respectively, stabilize the adjacent carbon radical. Thus, the decomposition of allyl halides proceeds by a radical non-chain mechanism (Eq. 1, below), where many halogen atoms are formed at a lower reaction temperature. The propenyl radicals that are cogenerated in the initial reaction mostly react with themselves on the walls of the container to form other organic compounds and carbon deposits. The dihaloorganic compounds dissociate via a third mechanism, the radical chain mechanism. Like the allyl halide decompositions, some atomic halogen is generated, but the halogen atoms attack the undissociated molecules by abstracting hydrogens and forming HX and a new stabilized radical (Eq. 2, below). These reactions have very low activation energies, so the predominant reactions are a set of chain reactions to produce HX and new haloorganics. Mercury atoms would have to compete with the haloorganics for the small concentration of halogen atoms. This would not work as well as the allyl unimolecular dissociations, because the low activation energies for the haloorganic reactions will consume atomic halogen and form HX.

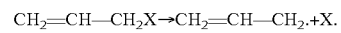

$$CH_2=CH-CH_2X \rightarrow CH_2=CH-CH_2.+X. \qquad [Eq.\ 1]$$

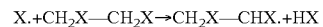

$$X.+CH_2X-CH_2X \rightarrow CH_2X-CHX.+HX \qquad [Eq.\ 2]$$

Allyl halides decompose via dissociation to halogen atoms without having to rely on the chain mechanism. An important point is that dilution with flue gas will inhibit the radical chain reaction mechanism, but will not inhibit the unimolecular reaction of allyl halides. Therefore, allyl halides are desired reagents for the introduction of large amounts of atomic halogen to the duct at an appropriate low-moderate temperature so they can oxidize mercury to stable species. In one example, allyl halides can be injected into a duct prior to an electrostatic precipitator device at a temperature in the range of approximately 320°-420° C. In one example, sulfuryl chloride is injected into the duct prior to an electrostatic precipitator and/or fabric filter and/or scrubber at a temperature in the range of approximately 100°-400° C. Other examples are also possible.

The use of activated carbon for mercury removal may not be desired for some utilities where contamination of the ash with carbon is not desired. The described organohalogen dissociation method for oxidation and capture on ash particulates or scrubbers can work well for many of these utilities. In other cases, higher removal rates may be achieved by using a combination of the atomic halogen produced by moderate-temperature dissociation of organic halides in conjunction with a sorbent. Atomic halogens appear to interact with elemental mercury on a carbon sorbent surface so as to promote the oxidation and reactivity on sorbent surfaces resulting in improved subsequent capture. It is known that a sorbent (carbon) surface can inhibit the radical decomposition of alkyl halides, so there seems to be some stabilizing factor operating on the radicals. Thus if the radicals are generated off of the surface, they may still be stabilized on contact with the surface and be available for reaction with the elemental mercury that also contacts the surface. Glass does not exhibit this effect, so it is unlikely that ash particles will stabilize the radicals as effectively as carbon.

The radical dissociation of an alkyl halide may be initiated by radical species such as NO. Thus dissociation in a NO stream or in the presence of flue gas containing NO may promote the radical dissociation mechanism for certain alkyl halides, but this does not necessarily generate more halogen atoms. In some cases, NO inhibits the chain reactions by scavenging radicals.

Photolytic dissociation of organic halides proceeds by a radical dissociation. For alkyl chlorides and bromides, considerable energy is required, and very short wavelengths would be necessary. However, halogenated carbonyl compounds, such as chloroacetone, absorb light of lower energy (for example, 313 nm), and thus gas-phase photodissociation of the halocarbonyl compounds may be a more practical method for halogen atom generation than alkyl halide photodissociation. Heating the haloketone typically increases quantum yields of photoproducts and may be applied to the flue gas reaction. Tertiary-butyl hypochlorite decomposes in sunlight via a radical reaction.

Certain inorganic nonmetal halides decompose to form reactive halogen radicals. These include halides of phosphorus, selenium, sulfur, silicon, and nitrogen. Examples of the compounds include $Se_2Br_2$, $SeOBr_2$, $PBr_3$, $PBr_5$, $POBr_3$, and $SiBr_4$, with or without promoters in the gas stream such as NO. A very inexpensive and convenient precursor is sulfuryl chloride ($SO_2Cl_2$), which is a low-boiling liquid that dissociates at about 100° C. Some of these inorganic halides are solids, but are soluble in organic solvents and, therefore, can be injected as a solution into the gas steam or into a carbon dispersion at an appropriate temperature to dissociate the halogens. Dissociation temperatures vary widely, but some are below 50° C. Dissociation products include atomic halogen radicals, bimolecular halogens, and various other reactive radicals containing halogen attached to the heteroatom.

The thermal and photochemical dissociations of organic fluorides result in breakage of the carbon-carbon bonds and produce various fluorocarbon products. Owing to the high strength of the carbon-fluorine bond, fluorine atoms or HF are not typically liberated during pyrolysis of fluorocarbons. Instead, the thermal decomposition results in cleavage of carbon-carbon bonds and formation of fluorocarbon radicals, often including difluorocarbene ($CF_2$:). The latter type of dissociations could be used to furnish reactive electrophilic radicals for oxidation of mercury. Pyrolysis of organofluorine compounds containing chlorine, oxygen, and other heteroatoms behaves similarly. Thus heating these organic halides to temperatures above the dissociation temperature (typically 260°-500° C.) in a gas stream, preferably an inert gas, generates difluorocarbene and other radicals such as $CF_3$. in the stream that oxidize elemental mercury in a flue gas stream when contacted with the organofluoride decomposition stream. In some cases where there is no C—C bond to break, such as formyl fluoride (125°-200° C.), atomic fluorine is liberated. Examples of the fluorocarbon decompositions are listed in Table 3. Table 3 shows examples of radical decomposition of various organofluorine reactants and the expected temperature of dissociation.

TABLE 3

Radical Decomposition of Organofluorine Reactants

| Reactant | Expected Temp. (° C.) of Dissociation |
| --- | --- |
| Chlorodifluoromethane | 425 |
| Hexafluoroacetone | 570 |
| Teflon | 360 |
| Trifluoroacetic Acid | 300 |
| Trifluoroacetyl Fluoride | 570 |

Difluorocarbene is highly electrophilic, so it reacts with elemental mercury, a Lewis base, resulting in its oxidation and conversion to an organo Hg(I) radical, i.e., $HgCF_2$.. This is reactive to any of a variety of species in the flue gas, such as HCl, $SO_2$, and $H_2O$ and forms organo Hg(II) species, such as $ClHgCF_2H$, etc.

The utilization of fluorocarbenes produced by moderate-temperature dissociation of organic fluorides can be used for mercury capture in conjunction with a sorbent. The interaction of the carbene with elemental mercury on a carbon sorbent surface promotes the oxidation and subsequent capture of mercury. A carbon surface can inhibit the radical decomposition of alkyl halides, so there seems to be some stabilizing factor operating on the radicals. Thus, if the radicals are generated off of the surface, they are stabilized on contact with the surface and available for reaction with the elemental mercury that also contacts the surface.

FIG. 1 is a schematic block diagram of one example of a halogen dissociation system applied to a coal-fired system 10. The coal-fired system 10 illustrates a coal combustor 12, an air preheater 14, a pollutant control device 16, a stack 18, and various ducts interconnecting the system 10. Arrows represent the direction of gas flow through various places in the system 10. The coal combustor 12 may be comprised of any desired type of device, such as a pulverized coal burner, a stoker burner, a fluidized-bed burner, or any other coal combustor or gasifier used in a coal-fueled system. Generally, coal is injected introduced to an input of the coal combustion system, where it is burned to generate heat. The flue gas is heated by the air preheater 14 and routed to the pollutant control device 16, where various pollutants are removed before releasing the flue gas to the atmosphere via the stack 18. For clarity, various other components present in a typical coal-fired system are not shown or described.

FIG. 1 also shows a halogen dissociation unit 20. The halogen dissociation unit 20 can be installed at any location between the boiler outlet and the inlet of the pollutant control device 16. In the example shown in FIG. 1, the halogen dissociation unit 20 is installed between the air preheater 14 and the pollutant control device 16. The halogen dissociation unit 20 may operate at temperatures that are, in one example, less than 500° C. The halogen dissociation unit 20 may be heated or energized in any desired manner (not shown), including electric heating. Halogen-containing materials may enter the dissociation unit 20 in any of their physical forms (i.e., gas, liquid, or solid) and decompose into atomic, molecular, and/or radical forms. The decomposed halogen species will then convey directly into the main flue gas stream 22. The carrier gas for the halogen compounds may include mixtures containing NO or $NO_2$, or any other suitable gas. The reactive halogens or halo radicals will efficiently oxidize elemental mercury vapor present in the main flue gas and/or enhance sorbent reactivity for improved subsequent mercury capture and/or convert gaseous mercury into particulate-associated forms, which can be collected by the pollutant control device 16.

Figure 2:
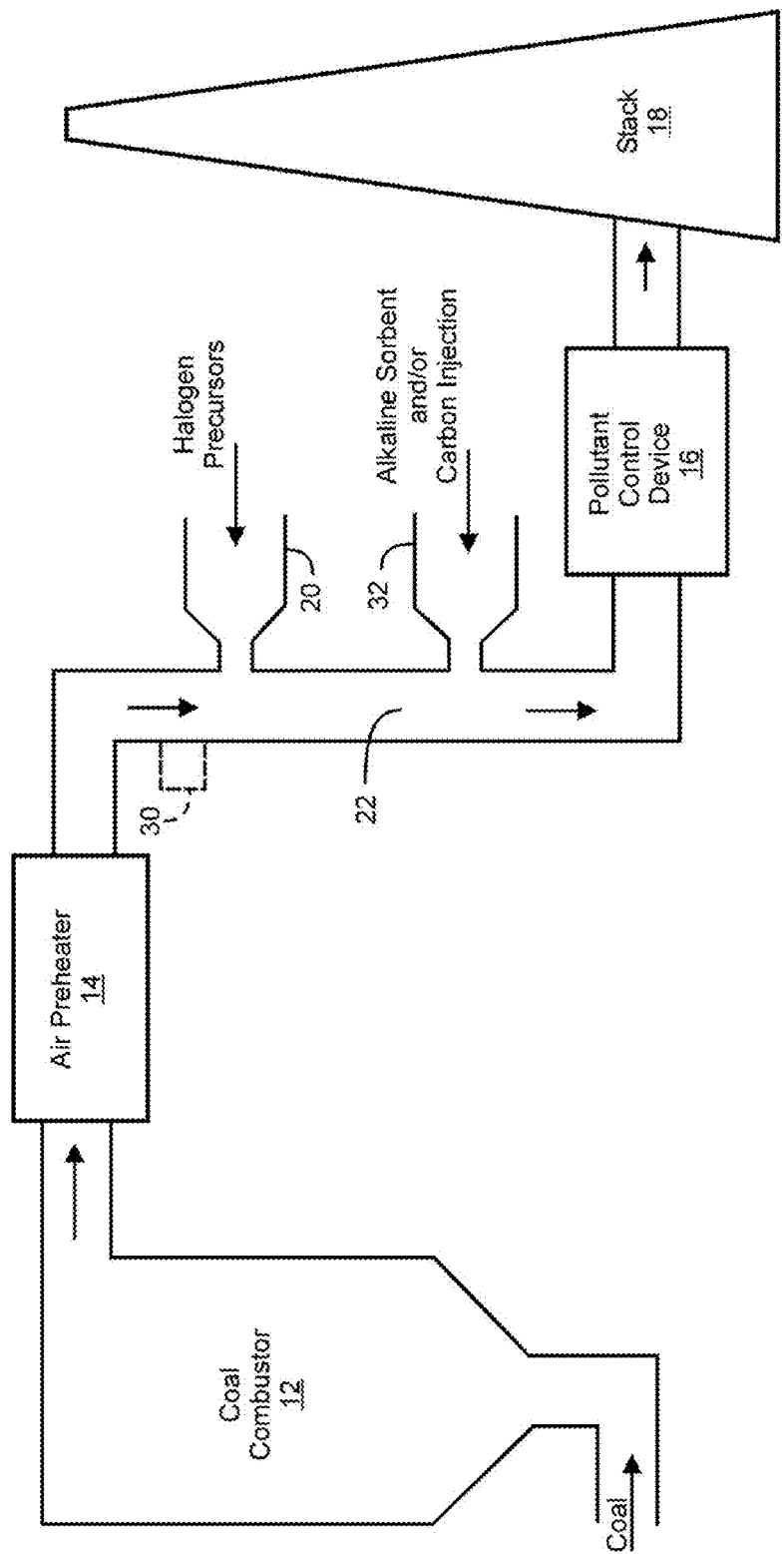
FIG. 2 is schematic diagram of another halogen dissociation system applied in a coal-fired system.

FIG. 2 is a schematic block diagram of another example of a halogen dissociation system applied to a coal-fired system 10. The coal-fired system 10, like the system shown in FIG. 1, illustrates a coal combustor 12, an air preheater 14, a pollutant control device 16, a stack 18, and various ducts interconnecting the system 10. In the example illustrated in FIG. 2, the halogen compound and/or sorbent (e.g., an Alkaline sorbent) is injected directly into the flue gas at an appropriate temperature (for example, 150°-500° C.) depending on the dissociation temperature, so that thermal decomposition occurs instantly and radicals are immediately available for reaction with mercury present in the flue gas. The oxidized mercury products are removed in a pollution control device following the point of injection at a temperature lower than the injection temperature. This example also illustrates that this system allows one to choose an appropriate halogen compound for an optimal injection location for mercury removal at a given plant configuration.

In another example, the invention includes the addition of a photolysis lamp 30 to the duct following the point of halide injection. The optional photolysis lamp 30 is illustrated in FIGS. 1 and 2 by a dashed box. Photodissociation of the alkyl halide to atomic halogen is therefore accomplished prior to mixing with the ash-containing gas stream.

Another alternative configuration of the current invention is also depicted in FIGS. 1 and 2. In this example, carbon black, char, or soot are in situ generated in a separate unit 32 by either thermal or arc processes, for example. In these examples, the in situ-generated carbon black, char, or soot is injected and is treated by the reactive halogens during their transit to the main flue gas duct 22. This embodiment can also be applied to dry sorbent (activated carbon) injection technologies. Injected particulates may also include alkaline compounds, such as CaO, CaSiO3, etc.

Figure 3:
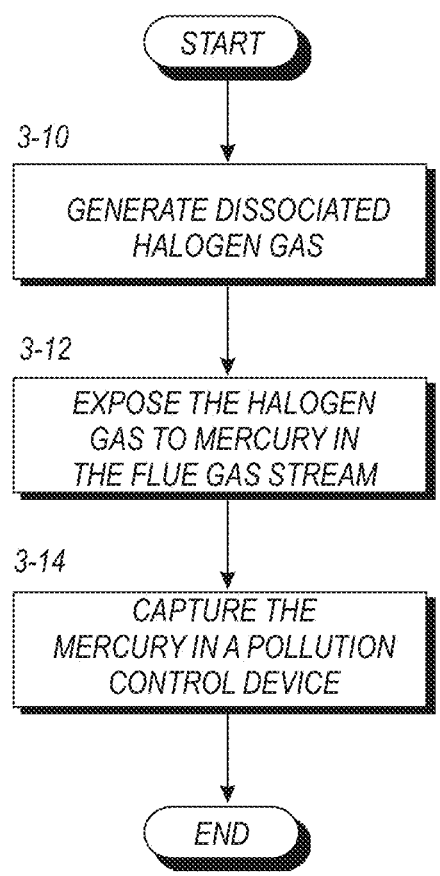
FIG. 3 is a flowchart illustrating one example of the operation of the present invention.

FIG. 3 is a flow chart illustrating an exemplary process for using one example of the present invention. This example will be described in the context of a mercury control system for a coal combustion system. The process begins at step 3-10 where a dissociated halogen gas is generated from a halogen compound. As described above, the halogen gas can be generated in any desired manner. In one example, the halogen compound is dissociated using a moderate temperature (e.g., a temperature less than 500° C.) process that dissociates halogen-containing material into atomic halogen forms. At step 3-12, the dissociated halogen gas is exposed to mercury present in the flue gas stream of the combustion system. As described above, the halogen gas may oxidize elemental mercury and/or transform gaseous mercury into a particulate-associated form. If desired, the dissociated halogen gas can be mixed with a carbon form that provides a reactive surface for the mercury oxidation. Finally, at step 3-14, the mercury (now oxidized and/or particulate-associated) is captured in a pollutant control device, such as an ESP.

While preferred embodiments of the invention have been shown and described, modifications thereof can be made by one skilled in the art without departing from the spirit and teachings of the disclosure. The embodiments described herein are exemplary only, and are not intended to be limiting. Many variations and modifications of the invention disclosed herein are possible and are within the scope of the invention.

Following are two specific examples of applications of the present invention to help in understanding the operation and advantages of the invention. Many other examples are also possible.

In a first example, the invention was tested for mercury oxidation and removal in a pilot-scale boiler by introducing alkyl halides (halogen precursor) into flue gas containing elemental mercury and determining the removal of mercury from the gas stream using continuous mercury emission monitors. In this example, an organic halide mixture composed of allyl iodide and tetrachloroethane (wt ratio 1:1) was injected into a flue gas from combustion of a Powder River Basin subbituminous coal. The flue gas contained approximately 10 μg/m$^3$ of elemental Hg. The alkyl halide mixture was pumped at 1 mL/min into a duct with the flue gas flowing at 132 scfm at 800° F. (427° C.). No carbon or basic sorbent was injected. The mercury concentration was determined downstream after particulate collection. Less than 3 μg/m$^3$ of mercury remained in the flue gas. Previous experiments at this temperature at the same flow rate showed no removal with no injection of organohalide reagent and no removal with injection of the tetrachloroethane at 1 mL/min. Thus the allyl iodide was responsible for oxidation and removal of 70% of the mercury from the gas stream.

In a second example, the demonstration test was conducted at a particulate test boiler equipped with an electrostatic precipitator (ESP). A series of experiments introduced hexane solutions of allyl iodide (RI), allyl chloride (RCl) and allyl bromide (RBr) vapors sequentially through a preheater into the duct with and without co-injection of activated carbon (AC) (in this example, Norit HG), which was expected to remove mercury from the gas phase. The pumping rate for the allyl halide solutions was adjusted to provide a constant concentration of 25 ppm of halogen in the flue gas, assuming complete conversion of the allyl halide to atomic halogen. The actual halogen concentration in the flue gas was not measured, however, so the 25 ppm represents a theoretical concentration. Total gaseous mercury and elemental mercury were determined at the inlet and at the outlet of the ESP by continuous mercury monitoring. The mercury measurements were taken prior to and after allyl halide injection and also after adding both allyl halide and activated carbon. The results are summarized in Table 4, below.

Prior to the addition of the allyl iodide, there was no capture across the ESP, and no additional oxidized Hg (both 10% Hg(2+)), thus no net oxidation across the ESP (see line 2 of Table 4). The addition of allyl iodide resulted in minimal capture in the ESP, owing to the low attachment rate to particulates, but much more of the Hg in the gas phase was oxidized (41% of the total) (see line 3 of Table 4). The addition of both allyl iodide and AC, however gave 78% capture across the ESP (see line 4 of Table 4).

Prior to the addition of allyl chloride, again there was no capture across the ESP (see line 5 of Table 4). After the addition of allyl chloride, the capture increased to 17%, and the oxidized Hg in the gas phase increased to 19% of the total (see line 6 of Table 4). The addition of allyl chloride and activated carbon gave 60% capture (see line 7 of Table 4).

Prior to the allyl bromide addition, the capture across the ESP was higher (24%) compared to 0% in prior experiments (see line 8 of Table 4). This may have been a residual effect of halogen or carbon in the duct. After the addition of allyl bromide, the capture increased to 44%, although the oxidized Hg in the gas phase was low (see line 9 of Table 4). After the addition of allyl bromide and AC, the capture increased to 79%, and the oxidized mercury in the gas phase to 25% (see line 10 of Table 4).

Clearly, the capture efficiencies are remarkably good for an ESP configuration, especially for allyl iodide and allyl bromide. This is consistent with the increase of oxidized mercury in the gas phase, which decreases in the order RI>RBr>RCl. This order is expected from the known reactivity of the halogen atoms toward flue gas constituents, so that chlorine atoms are depleted more rapidly by the flue gases compared to Br and I. This depletion may also occur in the self-reactions (Cl2 formation and HCl formation) occurring during the transit from the heater to the duct. To make the allyl chloride more effective, this distance (from the heater to the duct) may be minimized.

TABLE 4

| Experiment | Hg Total (g) ($\mu g/m^3$) | Capture (g) ($\mu g/m^3$) | Capture (%) | Hg Elem (g) ($\mu g/m^3$) | Hg(2+) (g) (%) |
|---|---|---|---|---|---|
| ESP Inlet | 6.3 | | | 5.7 | 10 |
| ESP Outlet without RI addition | 6.3 | 0 | 0 | 5.7 | 10 |
| ESP Outlet with RI addition | 6.1 | 0.2 | 3 | 3.6 | 41 |
| ESP Outlet with RI & AC addition | 1.4 | 4.9 | 78 | ND | — |
| ESP Outlet without RCl addition | 6.3 | 0 | 0 | ND | — |
| ESP Outlet with RCl addition | 5.2 | 1.1 | 17 | 4.2 | 19 |
| ESP Outlet with RCl & AC addition | 2.5 | 3.8 | 60 | ND | — |
| ESP Outlet without RBr addition | 4.8 | 1.5 | 24 | 4.7 | 2 |
| ESP Outlet with RBr addition | 3.5 | 2.8 | 44 | 2.6 | 25 |
| ESP Outlet with RBr & AC addition | 1.3 | 5.0 | 79 | ND | — |

ND = Not Determined

In the preceding detailed description, the invention is described with reference to specific exemplary embodiments thereof. The major difference between the detailed examples is that the liquid precursor is injected directly into the flue gas stream in the first example where it evaporates quickly and dissociates, whereas in the second example, the precursor was dissociated in a gas stream prior to its introduction into the flue gas. Various modifications and changes may be made thereto without departing from the broader spirit and scope of the invention as set forth in the claims. The specification and drawings are, accordingly, to be regarded in an illustrative rather than a restrictive sense.

What is claimed is:

1. A method of removing mercury from a flue gas stream of a coal combustion system having a combustor and a pollutant control device comprising:
   generating a dissociated halogen gas from a reactive precursor at a temperature in the range of about 60° C.-400° C. by providing activation energy to the reactive precursor;
   reacting the dissociated halogen gas with mercury present in the flue gas stream at a temperature in the range of about 60° C.-400° C., the dissociated halogen gas reacted with mercury in the flue gas stream at least one location downstream from the combustor and upstream of the pollutant control device;
   injecting particulates into the flue gas stream; and
   capturing the mercury using the pollutant control device.

2. The method of claim 1, wherein the dissociated halogen gas oxidizes the mercury present in the flue gas stream.

3. The method of claim 1, wherein the dissociated halogen gas transforms the mercury present in the flue gas stream into a particulate-associated form.

4. The method of claim 1, wherein the mercury is captured using at least one of a particulate control device such as an electrostatic precipitator, fabric filter, and scrubber.

5. The method of claim 1, wherein the dissociated halogen gas comprises a gas of at least one of allyl iodide, allyl chloride, allyl bromide, and any combination thereof.

6. The method of claim 1, wherein the dissociated halogen gas comprises at least one of organic di- and polyhalides including fluorocarbons, and inorganic non-metal halides with low decomposition temperatures.

7. The method of claim 1, wherein the particulates are comprised of at least one of activated carbon or alkaline compounds (CaO, CaSiO3).

8. The method of claim 1, further comprising exposing the precursor halogen gas to light from a photolysis lamp.

9. A method of removing mercury from a flue gas stream of a coal combustion system having a combustor and a pollutant control device, the method comprising:
   providing activation energy to a reactive precursor generating a dissociated halogen gas at a temperature in the range of about 60° C. to about 400° C.;
   reacting the dissociated halogen gas with mercury present in the flue gas stream at a temperature in the range of about 60° C. to about 400° C., the dissociated halogen gas reacted with the mercury at least one location of the flue gas stream downstream from the combustor and upstream of the pollutant control device;
   injecting particulates into the flue gas stream, the particulates comprised of at least one of activated carbon, alkaline compounds, or any combination thereof; and
   capturing the mercury using the pollutant control device.

10. The method of claim 9, wherein the dissociated halogen gas oxidizes the mercury present in the flue gas stream.

11. The method of claim 9, wherein the dissociated halogen gas transforms the mercury present in the flue gas stream into a particulate-associated form.

12. The method of claim 9, wherein the mercury is captured using at least one of a particulate control device such as an electrostatic precipitator, fabric filter and/or scrubber.

13. The method of claim 9, wherein the dissociated halogen gas comprises a gas of at least one of allyl iodide, allyl chloride, allyl bromide, and combinations thereof.

14. The method of claim 9, wherein the dissociated halogen gas comprises at least one of organic di- and polyhalides including fluorocarbons, and inorganic non-metal halides with low decomposition temperatures.

15. The method of claim 9, wherein the dissociated halogen gas comprises an organic chemical compound.

16. The method of claim 9, wherein the point of injection of the reactive precursor into a duct is at the appropriate temperature corresponding to the dissociation temperature of the reactive precursor and below the decomposition temperature of oxidized mercury.

17. The method of claim 16, wherein the reactive precursor is injected at least one location into the duct prior to an electrostatic precipitator device at a temperature in the range of about 320° C.-420° C.

18. The method of claim 16, wherein sulfuryl chloride is injected at least one location into the duct prior to an electrostatic precipitator, a fabric filter, and a scrubber at a temperature in the range of about 100° C.-400° C.

19. A method of removing mercury from a flue gas stream of a coal combustion system having a combustor and a pollutant control device comprising:
    providing activation energy to a reactive precursor generating a dissociated halogen gas from the reactive precursor at a temperature in the range of about 60° C.-400° C.;
    reacting the dissociated halogen gas with mercury present in the flue gas stream at a temperature in the range of about 60° C.-400° C., the dissociated halogen gas reacted with mercury in the flue gas stream at least one location downstream from the combustor and upstream of the pollutant control device;
    injecting particulates into the flue gas stream; and
    capturing the mercury using the pollutant control device.

* * * * *